United States Patent
McIntyre et al.

(10) Patent No.: US 10,944,113 B1
(45) Date of Patent: Mar. 9, 2021

(54) ELECTRODE HAVING PROTECTIVE AND LOCKING LAYERS ON CURRENT COLLECTOR

(71) Applicant: ZAF ENERGY SYSTEMS, INCORPORATED, Bozeman, MT (US)

(72) Inventors: Melissa D. McIntyre, Butte, MT (US); Adam Weisenstein, Bozeman, MT (US); Kurt Salloux, Livingston, MT (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 16/803,534

(22) Filed: Feb. 27, 2020

(51) Int. Cl.
| | | |
|---|---|---|
| *H01M 4/70* | (2006.01) | |
| *H01M 4/66* | (2006.01) | |
| *H01M 4/02* | (2006.01) | |
| *H01M 4/62* | (2006.01) | |

(52) U.S. Cl.
CPC .......... *H01M 4/70* (2013.01); *H01M 4/628* (2013.01); *H01M 4/661* (2013.01); *H01M 2004/021* (2013.01)

(58) Field of Classification Search
CPC ........ H01M 4/70; H01M 4/661; H01M 4/628; H01M 2004/021
See application file for complete search history.

(56) References Cited

U.S. PATENT DOCUMENTS

| | | | |
|---|---|---|---|
| 10,014,517 B2 | 7/2018 | Spotnitz et al. | |
| 10,103,386 B2 | 10/2018 | Hao | |
| 2004/0191631 A1* | 9/2004 | Fukui | H01M 4/70 429/231.95 |
| 2005/0064291 A1* | 3/2005 | Sato | H01M 4/38 429/233 |
| 2010/0266898 A1 | 10/2010 | Yamamoto et al. | |
| 2013/0108922 A1* | 5/2013 | Shinozaki | H01M 4/70 429/211 |
| 2013/0288128 A1 | 10/2013 | Li | |
| 2018/0226655 A1* | 8/2018 | Arai | H01M 10/052 |

* cited by examiner

*Primary Examiner* — Miriam Stagg
*Assistant Examiner* — Lilia Nedialkova
(74) *Attorney, Agent, or Firm* — Brooks Kushman P.C.

(57) ABSTRACT

An electrode includes a current collector, a metal shell in direct contact with and encapsulating the current collector, green dendritic columnar growths extending out of the metal shell and having protrusions thereon, and active material in contact with the metal shell and having embedded therein the green dendritic columnar growths. The protrusions penetrate the active material to form a mechanical retainer that prevents delamination of the active material from the metal shell and define localized regions of increased current density during operation of the electrode that promote deposition of the active material first on the protrusions and then on areas of the green dendritic columnar growths adjacent to the protrusions such that the active material electrochemically adheres to the green dendritic columnar growths and the protrusions enlarge during repeated charge and discharge cycling of the electrode.

7 Claims, 6 Drawing Sheets

ELECTRODE HAVING PROTECTIVE AND LOCKING LAYERS ON CURRENT COLLECTOR

TECHNICAL FIELD

This disclosure relates to an electrode containing a substrate having a metal shell encapsulating a current collector, and dendritic columnar growths extending from the metal shell.

BACKGROUND

Current collectors for electrochemical devices provide an active material scaffold and electron pathways from the active material. Current collectors, however, can be subjected to corrosion if not protected properly, leading to higher resistance and contamination of the electrochemical device. Adhesion of the active mass to the foil current collector can be poor during electrode fabrication and is slow at electrochemical adhesion during active mass formation of the electrode.

SUMMARY

An electrode includes a substrate comprised of a current collector, a metal shell in direct contact with and encapsulating the current collector, and green dendritic columnar growths extending out of the metal shell and having protrusions thereon. The electrode also includes active material in contact with the metal shell and having embedded therein the green dendritic columnar growths. The protrusions penetrate the active material to form a mechanical retainer that prevents delamination of the active material from the metal shell, and define localized regions of increased current density during operation of the electrode that promote deposition of the active material first on the protrusions and then on areas of the green dendritic columnar growths adjacent to the protrusions such that the active material electrochemically adheres to the green dendritic columnar growths and the protrusions enlarge during repeated charge and discharge cycling of the electrode.

DETAILED DESCRIPTION

Figure 1:
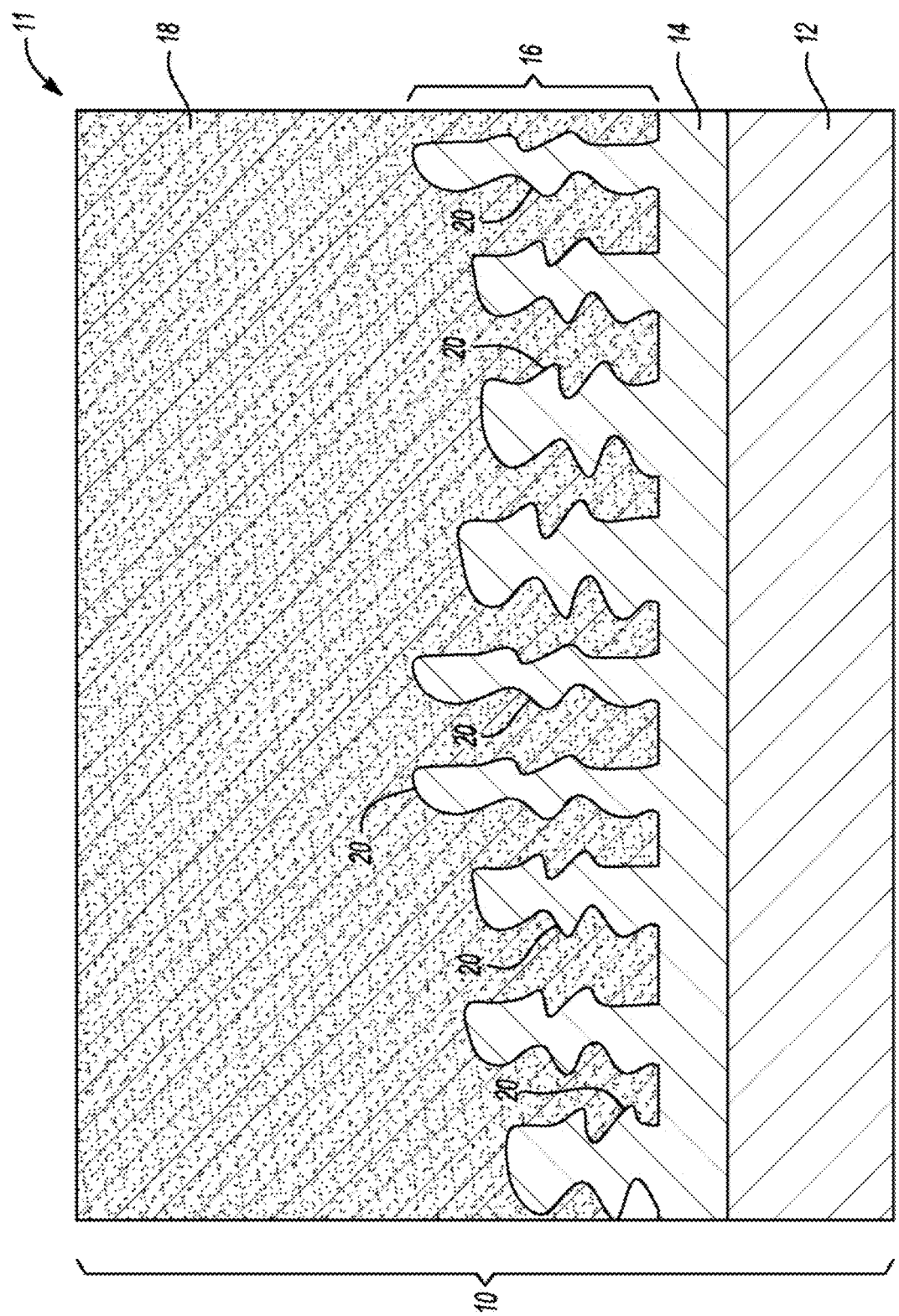
FIG. 1 is a schematic diagram, in cross-section, of a copper foil current collector, and blocking and locking layers adhered with active material before charge and discharge cycling.

Various embodiments of the present disclosure are described herein. The disclosed embodiments, however, are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Improving active material adhesion and current collector protection is helpful to achieving optimal battery performance. To protect the current collector from corrosion, while also improving adhesion and maintaining electrical contact with the active material, two layers of material may be grown on the current collector prior to attaching the active material. A dense, metal shell is first deposited onto the current collector. This blocking/protective layer prevents exposure and corrosion of the current collector to electrolyte throughout the life of the electrochemical device. The second layer, or locking layer, includes dendritic columnar growths extending out of the metal shell and having convex protrusions. Each of the dendritic columnar growths are comprised of a base, or trunk, that extends from the protective layer, and arms, or branches, that extend from the trunk. These branches increase in length and/or width during repeated charge and discharge cycles. The current collector and protective and locking layers define the substrate onto which the active material is attached. Thus, the active material is in contact with the metal shell and has embedded therein the dendritic columnar growths such that the convex protrusions penetrate the active material to form a mechanical retainer.

The current collector can be comprised of aluminum, brass, bronze, chromium, copper, graphite, nickel, stainless steel, silver, tin, zinc, or combinations thereof. The blocking layer can be comprised of bismuth, cadmium, gallium, indium, lead, mercury, thallium, tin, silver, zinc, or combinations thereof. The locking layer can be comprised of bismuth, cadmium, gallium, indium, lead, mercury, thallium, tin, silver, zinc, or combinations thereof. And, the active material can be comprised of zinc-based compounds (e.g., calcium zincate, metallic zinc, and zinc oxide), binders (e.g., polycarbonate, polyethylene, polypropylene, polytetrafluoroethylene, and polyvinyl alcohol), or gelling agents (e.g., acrylate polymers, carboxymethyl cellulose, hydroxyethyl cellulose, hydroxypropyl methylcellulose, polyacrylic acid, and polyethylene oxide). The active material can also include hydrogen gas suppression agents, zinc nucleation agents, zinc solubility reduction agents, or conductivity enhancement agents (e.g., aluminum oxide, barium oxide, bismuth oxide, cadmium, calcium hydroxide, conductive carbons, gallium, indium hydroxide, lead, mercury oxide, silver, tin oxides, and thallium oxide).

The dendritic columnar architecture prevents delamination of the active material from the metal shell and creates localized regions of increased current density during operation of the electrode that promote deposition of the active material. This deposition happens first on the convex protrusions and then on areas of the dendritic columnar growths adjacent to the convex protrusions, to electrochemically adhere the active material to the dendritic columnar growths. The increased adhesion, both mechanically and electrochemically, decreases interfacial impedance of the substrate and the active mass along with producing a more robust electrode. The dendritic columnar growths will continue to grow into the active material as the battery is cycled. The largest growth will occur at the convex protrusions of the dendritic columns first, followed by the growths adjacent to the convex protrusions. As such, the adhesion between the activate material and layers improves with use.

Conventionally, certain electrodes are fabricated by casting, pressing, or laminating the active material onto the current collector, building a cell with the electrodes, and then charging the cell at low current densities to electrochemically adhere the active material to the current collector. During this in situ deposition method, a protective layer forms as metal deposited onto the current collector. Current densities are kept low to create a smooth layer and prevent dendrite formation on the active material, which can pierce the separator resulting in a cell short. Interfacial resistance and electrochemical performance of cells made via the in situ deposition method can vary greatly since electrochemical adhesion will not occur where active material has delaminated from the current collector and will be limited to regions where the active material is in direct contact with the metal shell. Unlike substrates created via in situ deposition, substrates with the protective and locking layers created before attaching the active material and being built into a cell do not have delamination issues, resulting in initial improved lamination, and thus, utilization of the active material in cells during charge and discharge cycling. Dendritic columnar growths that have yet to be exposed to charge and discharge cycling are therefore referred to as green dendritic columnar growths.

FIG. 1 is a side view of an electrode 10 of a battery 11 containing a substrate with a current collector 12, a metal shell 14, or blocking layer, in direct contact with and encapsulating the current collector 12, and green dendritic columnar growths 16, or locking layer, extending out of the metal shell 14. Active material 18 is in contact with the metal shell 14 and has embedded therein the dendritic columnar growths 16 such that convex protrusions 20 thereof penetrate the active material 18 to form a mechanical retainer.

Figure 2:
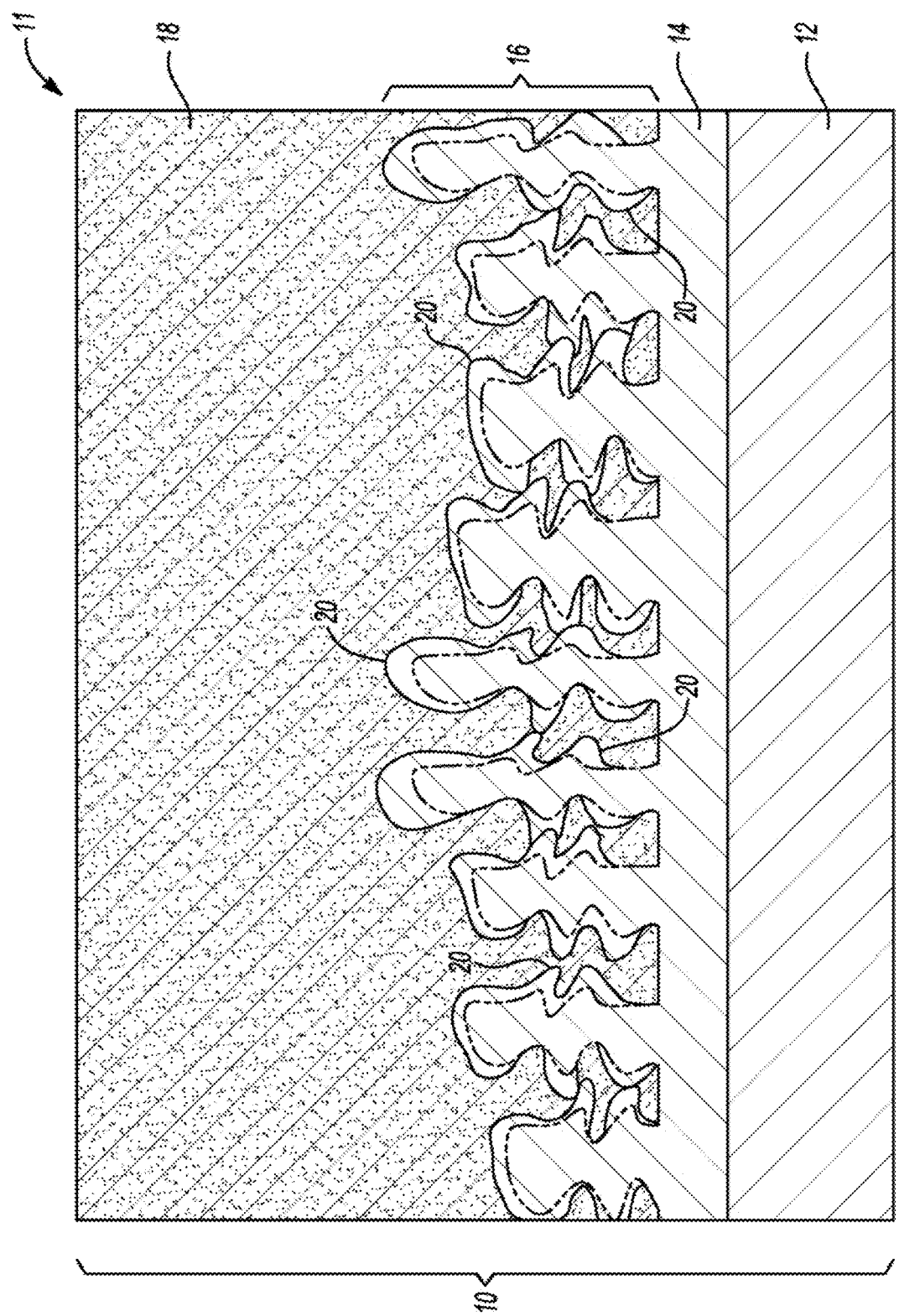
FIG. 2 is a schematic diagram, in cross-section, of the copper foil current collector, and blocking and locking layers adhered with active material of FIG. 1 after charge and discharge cycling.

FIG. 2 is a representation of FIG. 1 after repeated charge and discharge cycles. Significant growth of the dendritic columns 16, which are no longer green, has occurred at the convex protrusions 20.

Figure 3:
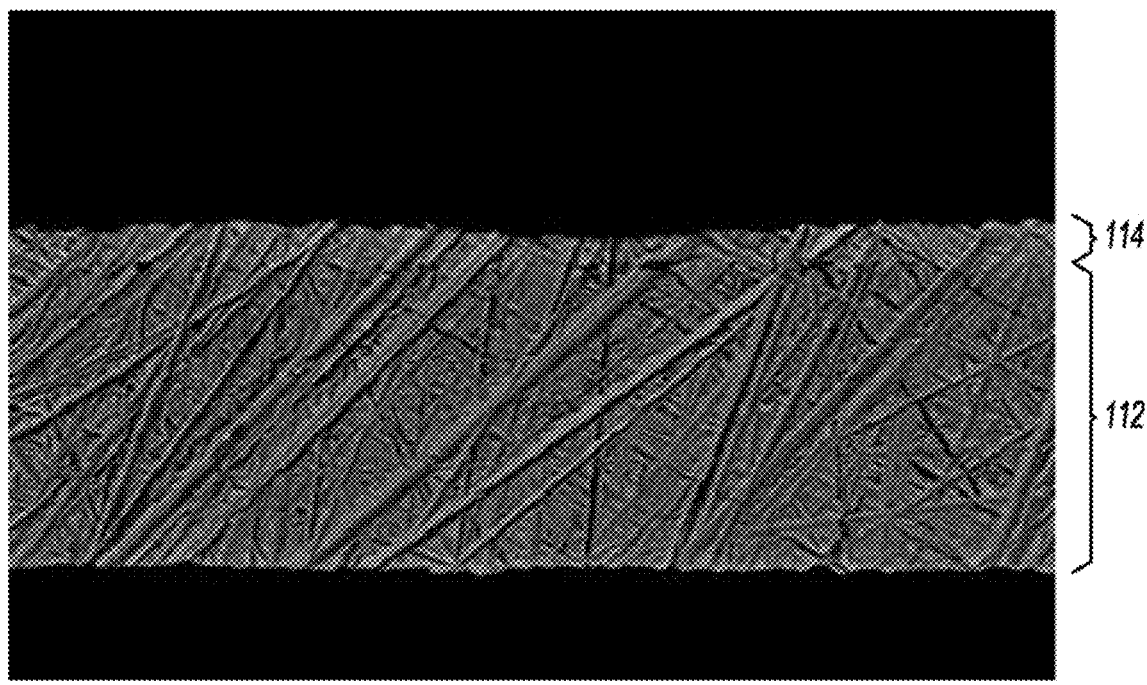
FIG. 3 is a field emission scanning electron microscope image, in cross-section, of a copper foil current collector with a blocking layer, before active material adhesion.
Figure 4:
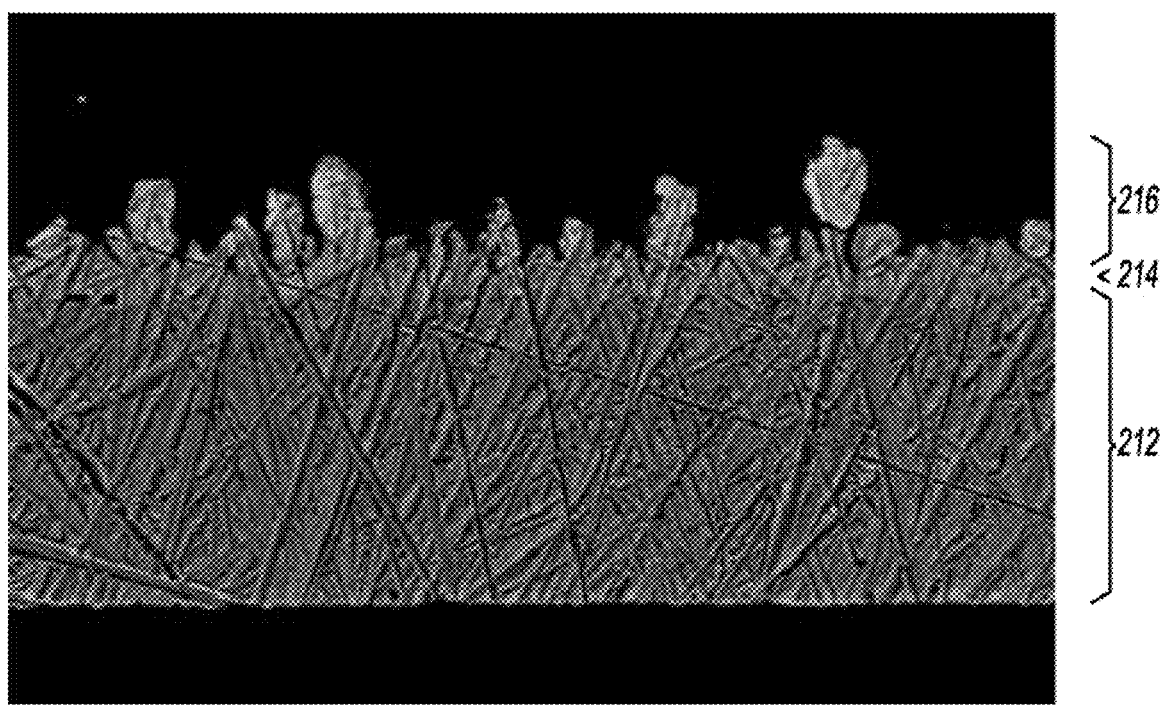
FIG. 4 is a field emission scanning electron microscope image, in cross-section, of a copper foil current collector with blocking and locking layers, before active material adhesion.

Protective and locking layers can be formed on a current collector via electrodeposition in acidic, neutral, or alkaline plating bath solutions. Although the current collector material and the metal to be electroplated should be considered when selecting the appropriate bath composition, the morphologies of the electrodeposited layers are tailored using different current densities and plating times. An example of this process involves creating zinc metal protective and locking layers on a copper foil current collector. Zinc is first deposited under low current density conditions to establish a protective zinc layer that encapsulates the copper foil. An example of the zinc metal protective layer is shown in FIG. 3, where a current collector 112 with a protective layer 114 was submerged in epoxy, polished, and imaged with a Field Emission Scanning Electron Microscope (FESEM). Longer plating times are typically employed to ensure complete coverage of the copper. A higher current density is then applied to promote dendritic columnar zinc growth on the protective layer, which creates the locking layer. An example of the dendritic columnar zinc growth on a zinc metal protective layer is shown in FIG. 4, where a current collector 212 with protective and locking layers 214, 216 was submerged in epoxy, polished, and imaged with FESEM. This novel process differs from traditional zinc plating methods where low current density plating conditions are employed to form a smooth, dense zinc plate and high current density plating conditions are avoided to prevent dendritic columnar zinc growth.

Electroplating zinc is a common method used to protect metals that are exposed to corrosive environments, such as zinc coated (galvanized) steel and iron that are used in commercial and industrial building materials to increase corrosion resistance. In order to form a protective layer, the plated metal should be a coherent, non-porous deposit. The two basic growth mechanisms include layer growth and nucleation-coalescence growth, both of which are affected by current densities and plating bath conditions during the plating process. For both mechanisms, grain growth occurs during the electrodeposition process creating steps or raised areas where the deposited metal will preferentially deposit. These protruding areas create localized high current density regions that promote selective deposition phenomenon. Applying high currents during electrodeposition enhances this phenomenon resulting in a nonuniform, rough plating layer. To improve efficiency and promote more uniform deposition, additives including leveling agents, brighteners, and carrier or wetting agents may be added to the plating bath. The types of additives are selected based on the metal to be deposited, the metal being plated on, and the plating bath solution.

The predominate electroplating methods for zinc coatings are alkaline cyanide, alkaline non-cyanide, and acid chloride plating baths. Since the zinc is intended to create a protective layer, the zinc layer must be dense and thick enough to prevent corrosion of the underlying metal surface. This zinc layer is typically formed by creating small grain zinc deposits that are grown on top of one another to create a dense, uniform barrier. As mentioned above, leveling agents, brighteners, and carrier or wetting agents such as aliphatic polyamines, aromatic aldehydes, fatty alcohols, heterocyclic amines, polyalcohol, polyamine, poly vinyl alcohol, or quaternary nicotinates are typically added to the plating bath to promote the formation of a uniform zinc layer.

Example One—Alkaline Bath Blocking and Locking Constant Current Deposition Techniques One example of a plating method used to deposit protective and locking zinc layers on a copper foil includes electrodeposition in an alkaline plating bath solution of sodium hydroxide and zinc metal or zinc oxide. Leveling, brightening, or wetting additives may be added to the solution. In this bath, the copper foil acts as the cathode and is positioned between two anodes that are comprised of consumable or non-consumable metal plates (e.g., zinc metal or nickel metal, respectively). This configuration is used to plate zinc on both faces of the copper foil. A pump agitates the plating bath solution with the solution flow directed across the copper to supply new reactant species ($Zn^2$) and remove gas products from the copper surface during the electrodeposition process. The protective and locking layers are formed using constant current deposition techniques. The protective layer is formed first by galvanostatic deposition at a constant current with a low current density (typically below 10 mA/cm$^2$) for a time period that is selected based on the desired zinc protective layer thickness where longer times are used to create a thicker zinc deposit. The locking layer is then formed by galvanostatic deposition at a constant current with a current density that is higher (3× or more) than the current density used to form the protective layer. Again, the deposition time is selected based on the desired zinc locking layer thickness. After plating, the zinc plated copper foil is rinsed to remove residual plating bath solution and then dried.

Example Two—Alkaline Bath Blocking and Locking Pulsed Deposition Techniques

The second example of zinc plating protective and locking layers on copper foil includes electrodeposition in the same alkaline plating bath solution and electrode configuration as in example one. This solution is agitated during the electrodeposition process while the protective and locking layers are formed using galvanostatic pulsed deposition techniques. The protective layer is formed by applying a galvanostatic rectangular-pulse waveform that has a longer off-time than on-time (typically off-times are 3× or more longer than on-times) to produce fine gain zinc deposits that create a coherent, non-porous layer. Additionally, the pulse current density is below 50 mA/cm$^2$ (typically between 20-40 mA/cm$^2$) to create fine grain deposits. The plating time period (total number of pulses) is selected based on the desired zinc protective layer thickness. Converse of the protective layer electrodeposition process, the locking layer is formed by applying a galvanostatic rectangular-pulse waveform that has a longer on-time than off-time to produce larger grain zinc deposits that create a rough, porous layer. The plating time period (total number of pulses) is selected based on the desired zinc locking layer thickness. After plating, the zinc plated copper foil is rinsed to remove residual plating bath solution and then dried. Although rectangular wave forms have been described, other waveforms, such as sinusoidal pulses or periodic-reverse pulses, can also be used.

Example Three—Alkaline Bath Blocking and Locking Constant Current and Pulsed Deposition Techniques The third example of zinc plating protective and locking layers on copper foil also includes electrodeposition in the same alkaline plating bath solution and electrode configuration as in example one. This solution is agitated during the electrodeposition process while the protective layer is formed using the constant current deposition technique and the locking layer is formed using the pulsed deposition technique. The protective layer is deposited on the copper foil using the same parameters as the protective layer formation in example one. The locking layer is grown on the protective layer using the same parameters as the locking layer formation in example two. After plating, the zinc plated copper foil is rinsed to remove residual plating bath solution and then dried.

Example Four—Alkaline Bath Blocking and Locking Pulsed and Constant Current Deposition Techniques The fourth example of zinc plating protective and locking layers on copper foil includes electrodeposition in the same alkaline plating bath solution and electrode configuration as in example one. This solution is agitated during the electrodeposition process while the protective layer is formed using the pulsed deposition technique and the locking layer is formed using the constant current deposition technique. The protective layer is deposited on the copper foil using the same parameters as the protective layer formation in example two. The locking layer is grown on the protective layer using the same parameters as the locking layer formation in example one. After plating, the zinc plated copper foil is rinsed to remove residual plating bath solution and then dried.

Example Five—Acid Chloride Bath Blocking and Locking Deposition Techniques

The fifth example of zinc plating protective and locking layers on copper foil includes electrodeposition in an acid chloride plating bath solution of potassium chloride and zinc metal or zinc oxide. Leveling, brightening, or wetting additives may be added to the solution. In this bath, the copper foil acts as the cathode and is positioned between two anodes that are comprised of consumable or non-consumable metal plates (e.g., zinc metal or nickel metal, respectively). This configuration is used to plate zinc on both faces of the copper foil. A pump agitates the plating bath solution with the solution flow directed across the copper to supply new reactant species ($Zn^2$ and remove gas products from the copper surface during the electrodeposition process. The protective and locking layers can be formed using constant current deposition techniques (see example one), pulsed deposition techniques (see example two), or combinations thereof (see examples three and four). After plating, the zinc plated copper foil is rinsed to remove residual plating bath solution and then dried.

Example Six—Alkaline Bath and Acid Chloride Bath Blocking and Locking Deposition Techniques The sixth example of zinc plating on copper foil includes electrodeposition of the zinc protective layer in the same alkaline plating bath solution in example one followed by the electrodeposition of the zinc locking layer in the same acid chloride bath solution in example five. The protective layer is deposited on the copper foil and the locking layer is gown on the protective layer using any of the constant current and/or pulse parameters outlined in examples one though four.

Example Seven—Acid Chloride Bath and Alkaline Bath Blocking and Locking Deposition Techniques The seventh example of zinc plating on copper foil includes electrodeposition of the zinc protective layer in the same acid chloride bath solution in example five followed by the electrodeposition of the zinc locking layer in the same alkaline plating bath solution in example one. The protective layer is deposited on the copper foil and the locking layer is grown on the protective layer using any of the constant current and/or pulse parameters outlined in examples one though four.

Although the above examples are written for galvanostatic deposition processes, potentiostatic deposition processes could also be used, etc.

Improved adhesion between the active material and current collectors with the protective and locking layers was verified by several tests designed to evaluate mechanical and electrochemical adhesion. In these tests, electrodes were fabricated with a zinc-based active material. The electrodes employed current collectors comprised of copper foil with a zinc protective layer and a zinc locking layer or plain copper foil for direct comparison.

Figure 5:
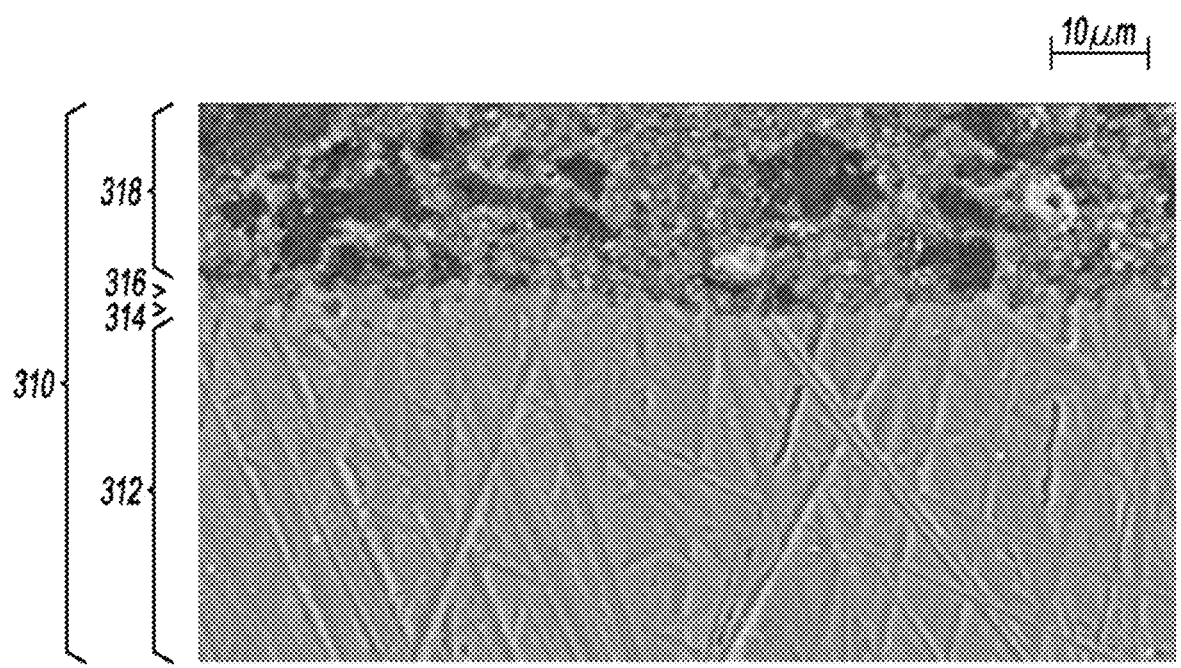
FIG. 5 is a field emission scanning electron microscope image, in cross-section, of a copper foil current collector with blocking and locking layers adhered with active material.
Figure 6:
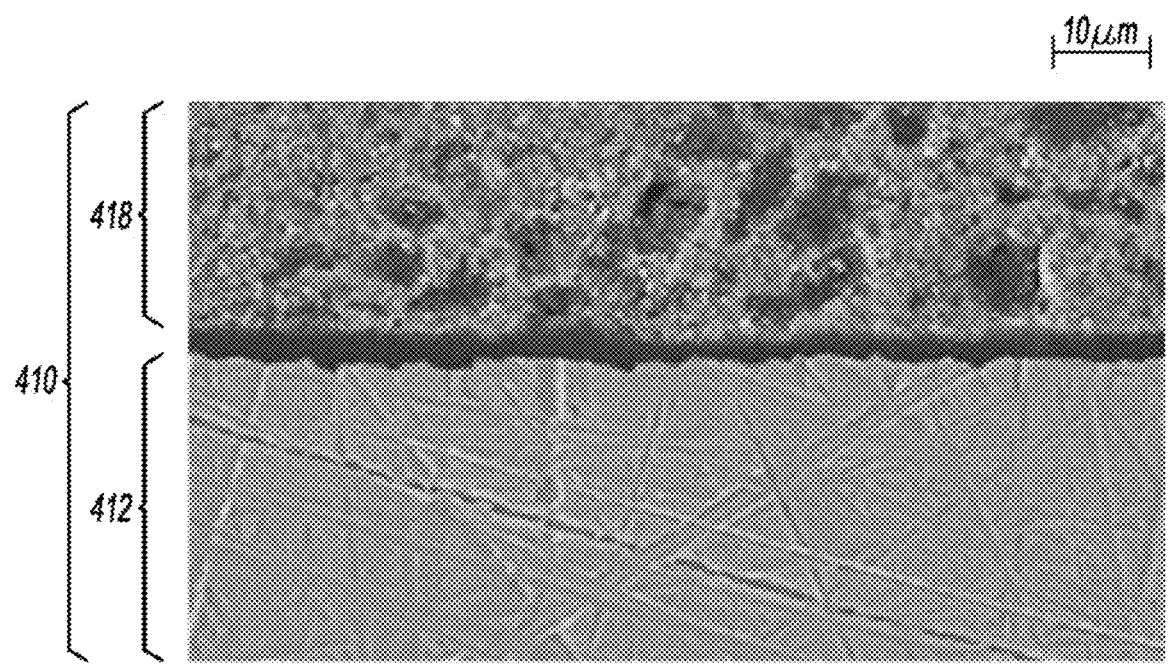
FIG. 6 is a field emission scanning electron microscope image, in cross-section, of a copper foil current collector without blocking and locking layers delaminated from active material.

Mechanical adhesion between the active material and current collector in electrodes was examined with cross section images of the electrodes. Pristine, green tape electrodes 310, 410 were submerged in epoxy, polished, and imaged with FESEM as shown in FIGS. 5 and 6 respectively. FIG. 5 shows a current collector 312, protective layer 314, locking layer 316, and active material 318. FIG. 6 shows a current collector 412 and active material 418. These images reveal that the active material 318 and the current collector 312 with the protective and locking zinc layers 314, 316 are in direct contact. The active material 418, however, has delaminated from the plain copper foil current collector 412. These results demonstrate that mechanical adhesion is superior for current collectors utilizing protective and locking layers.

Figure 7:
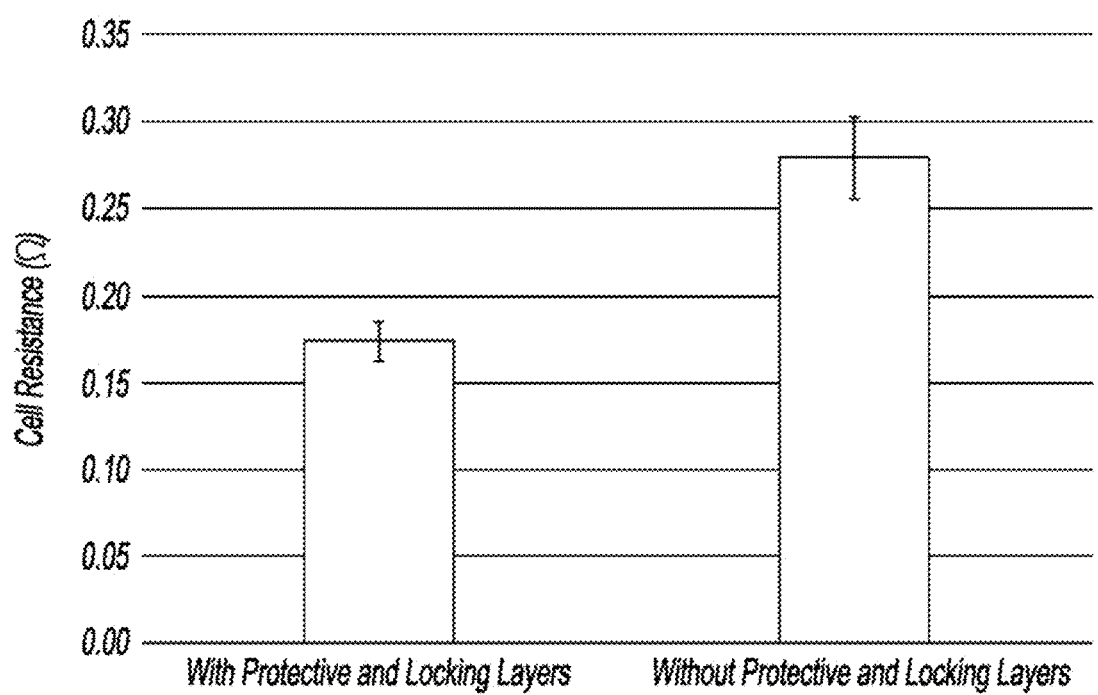
FIG. 7 is a column chart of cell resistance for cells with and without blocking and locking layers.
Figure 8:
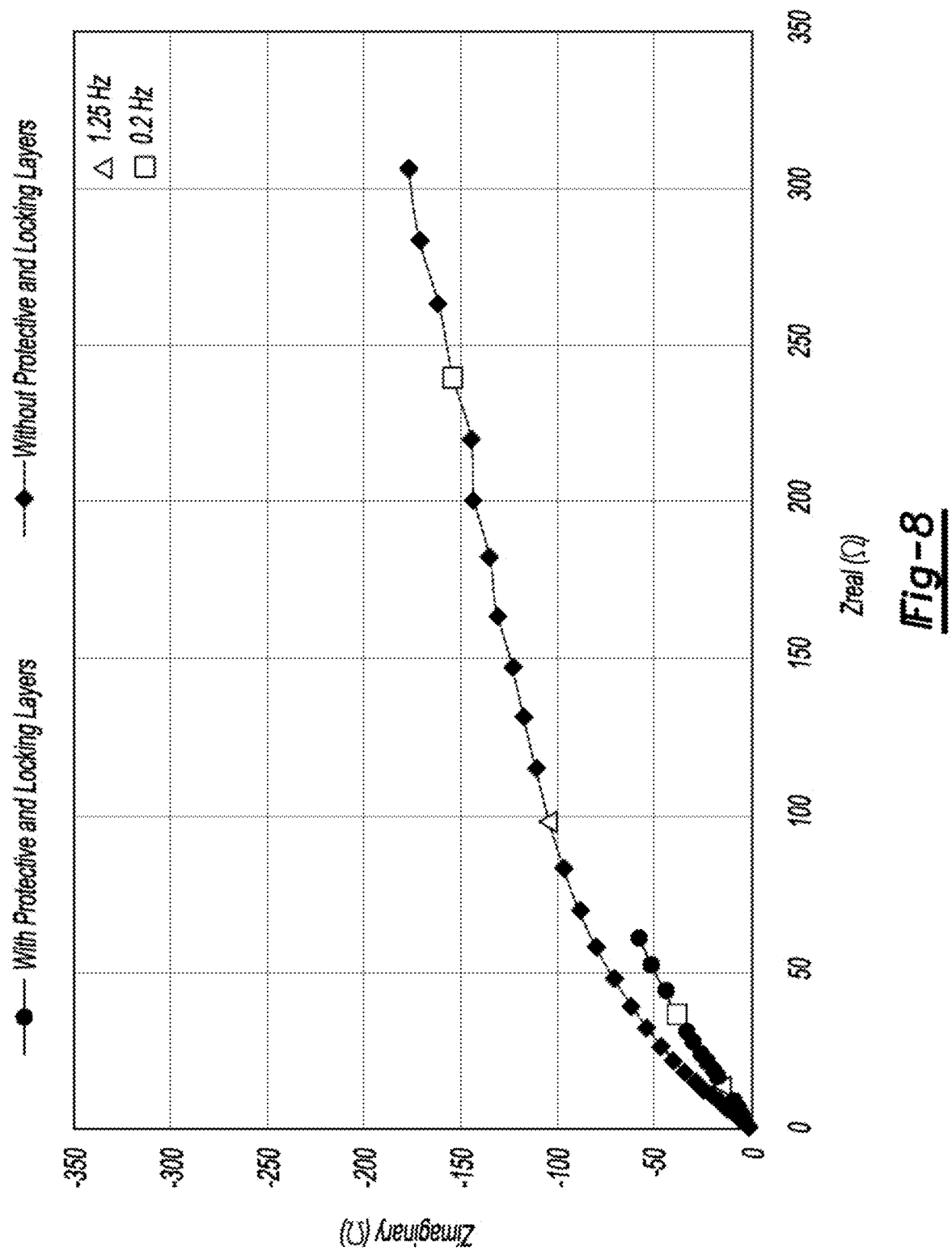
FIG. 8 is an electrochemical impedance spectroscopy Nyquist plot for cells with and without blocking and locking layers.

For electrochemical adhesion tests, cells were constructed with electrodes having the protective and locking zinc layer current collector or plain copper current collector paired with nickel-based electrodes. The cells were filled with an alkaline electrolyte. Electrochemical impedance measurements were performed to evaluate differences in cell impedances associated with electrochemical adhesion due to the presence or absence of the protective and locking zinc layers. The interfacial resistance between the active material and current collector dominates at high frequencies while charge transfer and mass transport impedances within the active material are observed at lower frequencies. To determine the interfacial resistance, cell impedance was recorded at a single frequency of 1 kHz. As shown in FIG. 7, the electrodes with the protective and locking layers exhibit a lower average resistance, 0.17±0.01Ω, compared to electrodes with the plain copper foil, 0.28±0.02Ω. The lower resistance is attributed to increased electric contact between the active material and current collector. To examine how the interfacial resistance influences charge transfer and mass transport impedances, Electrochemical Impedance Spectroscopy (EIS) measurements were conducted over a range of 100,000-0.1 Hz. The EIS Nyquist plot for two cells are presented in FIG. 8. The smaller semicircle for the cell with the protective and locking zinc layers is indicative of lower impedances. This behavior is ascribed to increased electric contact with the current collector improving connectivity within the active materials that may otherwise be isolated in the electrode with a plain copper foil current collector. Both single frequency and EIS results demonstrate overall lower impedances due to improved electrical adhesion in electrodes with the protective and locking layers.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to appearance, cost, durability, ease of assembly, life cycle cost, manufacturability, marketability, packaging, serviceability, size, strength, weight, etc. As such, embodiments described as less desirable than other embodiments or prior art implementations with respect to one or more characteristics are not outside the scope of the disclosure and may be desirable for particular applications.

What is claimed is:

1. An electrode comprising:
   a current collector;
   a zinc metal shell in direct contact with and encapsulating the current collector;
   green dendritic columnar growths extending out of the zinc metal shell and having protrusions thereon; and
   active material in contact with the zinc metal shell and having embedded therein the green dendritic columnar growths, wherein the protrusions (i) penetrate the active material to form a mechanical retainer that prevents delamination of the active material from the zinc metal shell and (ii) define localized regions of increased current density during operation of the electrode that promote deposition of the active material first on the protrusions and then on areas of the green dendritic columnar growths adjacent to the protrusions such that the active material electrochemically adheres to the green dendritic columnar growths and the protrusions enlarge during repeated charge and discharge cycling of the electrode.

2. The electrode of claim 1, wherein a material of the zinc metal shell and a material of the dendritic columnar growths are same.

3. The electrode of claim 1, wherein the active material is zinc based.

4. The electrode of claim 1, wherein the current collector includes aluminum, brass, bronze, chromium, copper, graphite, nickel, stainless steel, silver, tin, zinc, or combinations thereof.

5. The electrode of claim 1, wherein the zinc metal shell further includes bismuth, cadmium, gallium, indium, lead, mercury, thallium, tin, silver, or combinations thereof.

6. The electrode of claim 1, wherein the green dendritic columnar growths include bismuth, cadmium, gallium, indium, lead, mercury, thallium, tin, silver, zinc, or combinations thereof.

7. A battery comprising:
   the electrode of claim 1.

* * * * *